Figure 3:
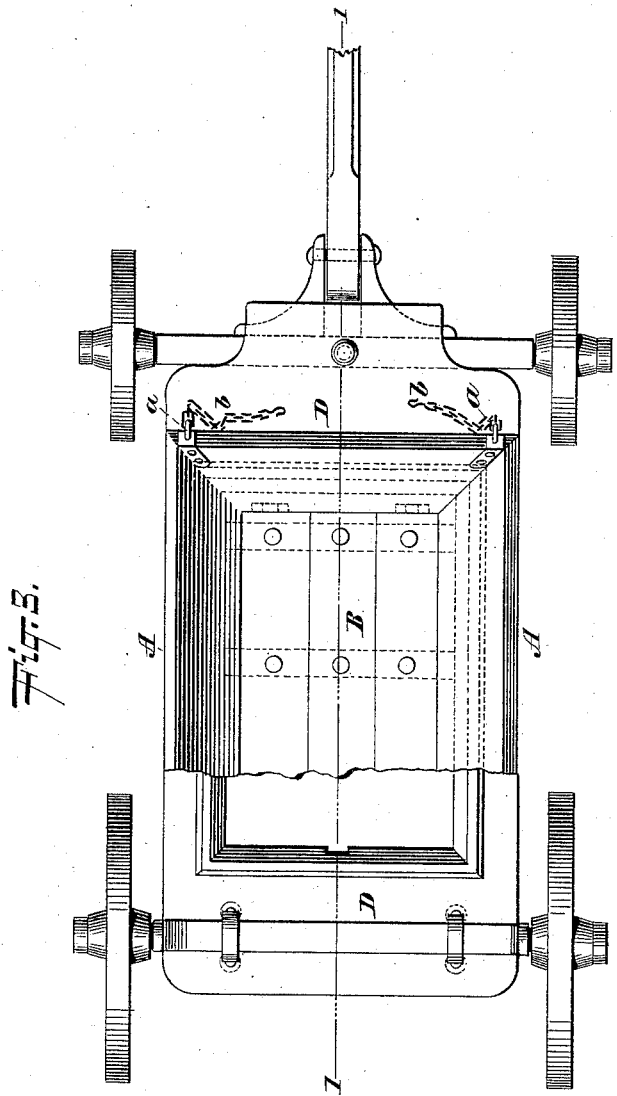

(No Model.) 2 Sheets—Sheet 1.
C. M. WESTOVER.
DUMPING CART.
No. 468,588. Patented Feb. 9, 1892.
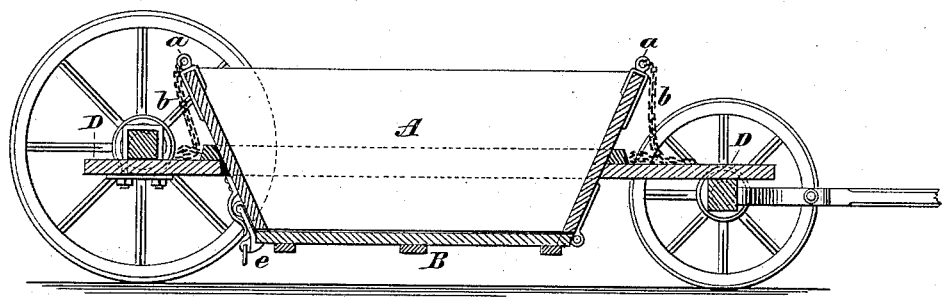
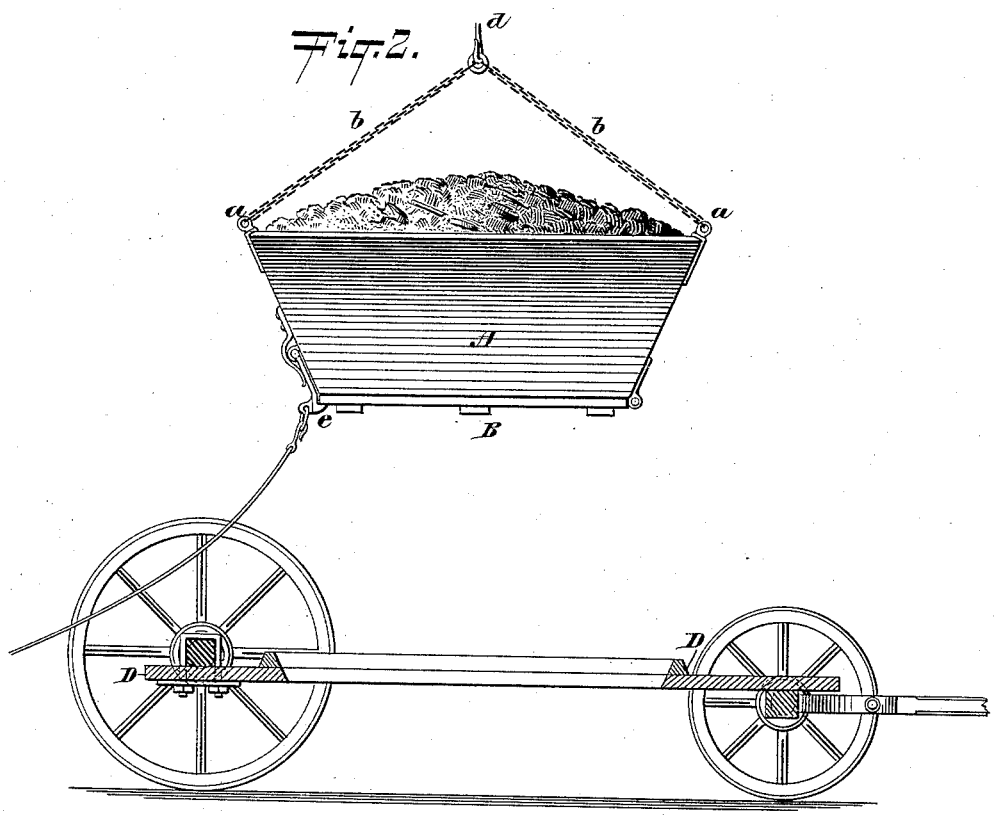
WITNESSES:
Gustave Dieterich
R. C. Mitchell
INVENTOR
Cynthia M. Westover.
BY Briesen & Knauth
her ATTORNEYS.

(No Model.) 2 Sheets—Sheet 2.
C. M. WESTOVER.
DUMPING CART.

No. 468,588. Patented Feb. 9, 1892.

WITNESSES:
Gustave Dieterich
R. C. Mitchell

INVENTOR
Cynthia M. Westover.
BY Briesen & Knauth
her ATTORNEYS.

UNITED STATES PATENT OFFICE.

CYNTHIA M. WESTOVER, OF NEW YORK, N. Y.

DUMPING-CART.

SPECIFICATION forming part of Letters Patent No. 468,588, dated February 9, 1892.

Application filed February 25, 1891. Serial No. 382,754. (No model.)

*To all whom it may concern:*

Be it known that I, CYNTHIA M. WESTOVER, a resident of the city, county, and State of New York, have invented a new and useful Improvement in Dumping-Carts, of which the following is a full and clear description.

My invention relates to an improved dumping-cart; and it consists in providing in the frame of a cart a removable receiver in which may be transported ashes, garbage, sweepings, or the like to a suitable spot for depositing said contents, and then by lifting the body from the wagon by a derrick or other suitable means it may be swung around into any desired position and the ashes dropped by releasing a swinging bottom or side.

The object of my invention is to construct a dumping-cart the receiver of which shall be near to the ground to facilitate the easy loading and to thereby allow the easy draft of said cart; again, to allow that portion of the wagon or cart which holds the ashes or garbage to be lifted from the truck in the manner hereinafter specified, so that the ashes may be placed or dumped in any desired spot, and also to provide a beveled platform or frame to hold said removable portion of the wagon or cart firmly upon and within the truck.

My invention is illustrated by the accompanying drawings, in which—

Figure 1 is a longitudinal part-sectional view of my improved cart. Fig. 2 is a part-longitudinal section showing the ash-receiver in an elevated position over the truck. Fig. 3 is a plan view showing the receiver partly broken away.

A is the ash-receiver formed of inclining sides, as shown. B is the bottom of this receiver, and is preferably hinged at one lower edge of the receiver and fastened by a latch $e$ at the opposite lower edge of said receiver. One or more of the sides of the receiver A may be thus hinged instead of the bottom. Near the upper corners of the receiver are ring-bolts or the like $a\,a$. To these ring-bolts can be fastened chains $b\,b$ or equivalent rods or ropes. These chains are so arranged and of such a length that they may be gathered together directly over the center of the receiver, so that by the aid of a hook $d$, suspended from a suitable derrick, the chains may be caught up and the receiver lifted from the truck and swung around into any desired position for dumping, whereupon by pulling on the latch $e$ the bottom will be caused to drop and the contents to disappear.

The truck of my cart has the main platform or frame D, carried by two or four wheels, as preferred, and so recessed or cut away that the walls of the receiver A will fit the recess, allowing part of the removable body to remain above and part of the lower part of the body A to go below said frame D, thereby affording a substantial support for said receiver. In order to prevent wear upon the receiver, the edges of this hole are properly beveled, so as to present a flat surface to the inclining sides of the receiver A. By this method I am enabled to construct a cart that will be capable of easy filling because of its close proximity to the earth, and which for the same reason can be more easily drawn than a cart carrying the same weight, but with said weight situated on a higher plane. Pins or levers may be applied to the truck or receiver for locking them properly together while the truck is in motion.

The beveling of the platform D holds the body A firmly and prevents the shaking or rattling of the body A while the cart is in motion or if the body A should shrink or wear away.

Having thus described my invention, what I desire to secure by Letters Patent and claim is—

The combination, in a dumping-cart, of the truck D, recessed, as described, to support a removable receiver A, so that part of said receiver will be above and part below the axle, said receiver having inclined sides, and the swinging bottom B, adapted to receive lifting-chains $b\,b$, and said truck D having beveled inner edges to receive the body A, all arranged substantially as herein shown and described.

CYNTHIA M. WESTOVER.

Witnesses:
 HARRY M. TURK,
 R. C. MITCHELL.